(12) United States Patent
Schneider (10) Patent No.: US 8,589,592 B2
(45) Date of Patent: Nov. 19, 2013

(54) EFFICIENT OBJECT DISTRIBUTION

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 781 days.

(21) Appl. No.: 12/001,510

(22) Filed: Dec. 11, 2007

(65) Prior Publication Data

US 2009/0150474 A1   Jun. 11, 2009

(51) Int. Cl.
*G06F 15/16* (2006.01)

(52) U.S. Cl.
USPC ............ 709/248; 709/220; 709/223; 709/224

(58) Field of Classification Search
USPC .................. 709/203, 217, 219–220, 227, 248
See application file for complete search history.

(56) References Cited

U.S. PATENT DOCUMENTS

| | | | | |
|---|---|---|---|---|
| 5,155,847 A * | 10/1992 | Kirouac et al. | ............... | 709/221 |
| 5,640,564 A * | 6/1997 | Hamilton et al. | ............. | 719/315 |
| 5,721,907 A * | 2/1998 | Pyne | ..................... | 1/1 |
| 5,752,042 A * | 5/1998 | Cole et al. | ..................... | 717/173 |
| 5,845,077 A * | 12/1998 | Fawcett | ........................ | 709/221 |
| 5,999,740 A * | 12/1999 | Rowley | ........................... | 717/173 |
| 6,038,568 A * | 3/2000 | McGrath et al. | ....................... | 1/1 |
| 6,076,084 A * | 6/2000 | Harlan | ........................... | 715/748 |
| 6,098,079 A * | 8/2000 | Howard | .................................. | 1/1 |
| 6,154,747 A * | 11/2000 | Hunt | ................................... | 1/1 |
| 6,363,524 B1 * | 3/2002 | Loy | ................................. | 717/170 |
| 6,477,703 B1 * | 11/2002 | Smith et al. | ..................... | 717/168 |
| 6,493,871 B1 * | 12/2002 | Welch et al. | ..................... | 717/173 |
| 6,513,050 B1 * | 1/2003 | Williams et al. | ....................... | 1/1 |
| 6,636,872 B1 * | 10/2003 | Heath et al. | ........................... | 1/1 |
| 6,751,794 B1 * | 6/2004 | McCaleb et al. | ............... | 717/168 |
| 6,757,900 B1 * | 6/2004 | Burd et al. | ...................... | 719/316 |
| 6,880,086 B2 * | 4/2005 | Kidder et al. | .................. | 713/191 |
| 7,478,381 B2 * | 1/2009 | Roberts et al. | ................. | 717/168 |
| 7,512,635 B1 * | 3/2009 | Solin | ...................................... | 1/1 |
| 7,574,706 B2 * | 8/2009 | Meulemans et al. | ........... | 717/174 |
| 7,702,673 B2 * | 4/2010 | Hull et al. | ...................... | 707/707 |
| 7,900,056 B1 * | 3/2011 | Murphy, Jr. | .................... | 713/189 |
| 2002/0085028 A1 * | 7/2002 | Tabatabai et al. | ............. | 345/748 |
| 2002/0100036 A1 * | 7/2002 | Moshir et al. | ................. | 717/173 |
| 2003/0225797 A1 * | 12/2003 | Shields et al. | ................. | 707/202 |
| 2004/0040021 A1 * | 2/2004 | Bharati et al. | ................ | 717/170 |
| 2004/0153478 A1 * | 8/2004 | Igouchkine | .................... | 707/200 |
| 2005/0080823 A1 * | 4/2005 | Collins | .......................... | 707/200 |
| 2005/0273472 A1 * | 12/2005 | Reddy et al. | ................. | 707/104.1 |
| 2006/0089954 A1 * | 4/2006 | Anschutz | ....................... | 707/202 |
| 2006/0130045 A1 * | 6/2006 | Wesley et al. | ................. | 717/168 |
| 2006/0149806 A1 * | 7/2006 | Scott et al. | ..................... | 709/201 |
| 2007/0143392 A1 * | 6/2007 | Choe et al. | ..................... | 709/203 |
| 2007/0255530 A1 * | 11/2007 | Wolff | ............................ | 702/187 |
| 2008/0294678 A1 * | 11/2008 | Gorman et al. | ............... | 707/102 |

* cited by examiner

*Primary Examiner* — David Lazaro
*Assistant Examiner* — Sarah Drabik
(74) *Attorney, Agent, or Firm* — Lowenstein Sandler LLP (57) ABSTRACT

A method and apparatus for distributing objects over a network. In one embodiment, the method comprises sending a request from a first network entity to a second network entity, the request including a compressed representation of deployed objects that are currently deployed at the first network entity. The method further comprises the first network entity receiving from the second network entity a difference between the deployed objects and objects to be deployed on the first network entity as indicated by the second network entity.

9 Claims, 6 Drawing Sheets

OPERATIONS PERFORMED BY DATA MANAGER

EFFICIENT OBJECT DISTRIBUTION

TECHNICAL FIELD

Embodiments of the present invention relate to distribution of data over a network, and more specifically, to the management of data distributed as objects over a network.

BACKGROUND

Many devices can be configured and commanded over a network. For example, a network monitoring system can install configurable devices in the network to monitor network activities. Each configurable device can be configured over the network to collect status or event statistics of interest to a user. With hundreds of these devices and hundreds or thousands of events to monitor by each device, transmitting the configuration data over a network can consume significant amount of bandwidth. Occasionally, the transmission may take so long that it times out before completion. As another example, network security policies can be distributed as a collection of commands from one device to another. Transmission of a large number of commands over a network to a large number of devices also consumes a significant amount of bandwidth.

Conventionally, data distribution is generally initiated by a server. Data sent by the server usually includes a complete and detailed data file that enables a device to operate properly. When there is an update to the data file, the server would send the entire updated data file to the device. Generating the entire data file for ordinarily minor updates consumes server resources. Further, if there is a minor error in the transmission of the data file, the entire file needs to be re-sent over again.

Therefore, there is a need to improve distribution of policy data, such that the above-mentioned problem can be overcome.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for distributing data objects efficiently over a network. In one embodiment, the distributed data object has a serialized canonical form, which is completely deterministic and unique representation. Illustratively, a data object may include a collection of rules to specify a security policy of a network device, a collection of configuration items to configure a device to perform application-specific tasks (e.g., collecting a particular status from a network), or other data items that a device needs to have for proper operations. Instead of requesting (and receiving) all of the data objects at once, a device assembles a list of data object that it currently has. For each of the data objects in the list, the device calculates a fingerprint and sends the fingerprint to a data manager that manages a data repository to request an update. The data repository stores the data object that a device should have or needs to have to ensure proper operations of the device. The device then receives the differences between what it currently has and what it should have, and updates its settings accordingly.

One advantage of the techniques described herein is that data objects can be introduced to a device incrementally. Instead of transporting the entire data file of a device all at once, only the differences between what a device currently has and what it should have are transmitted. As there is less data to pass, the resource requirements on either side of the transmission are greatly reduced. With the techniques described herein, resources on a data manager would not be entirely taken up by the tasks of scheduling the data flow for hundreds or thousands of devices. Rather, repetitive actions for distributing data to a particular device is handled by that device instead of the data manager. Moreover, in a system of hundreds or thousands of devices with hundreds or thousands of data objects to deploy, the techniques described herein significantly reduce the bandwidth requirement for data distribution.

It is noted that the technique described herein is applicable to a policy propagation network that propagates policy objects to network entities. The technique can also be applied to a configuration management system in which configuration objects are distributed. The object distribution can be centralized by a sever, or can be distributed by data exchanges among peer network devices.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "comparing", "hashing", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1A:
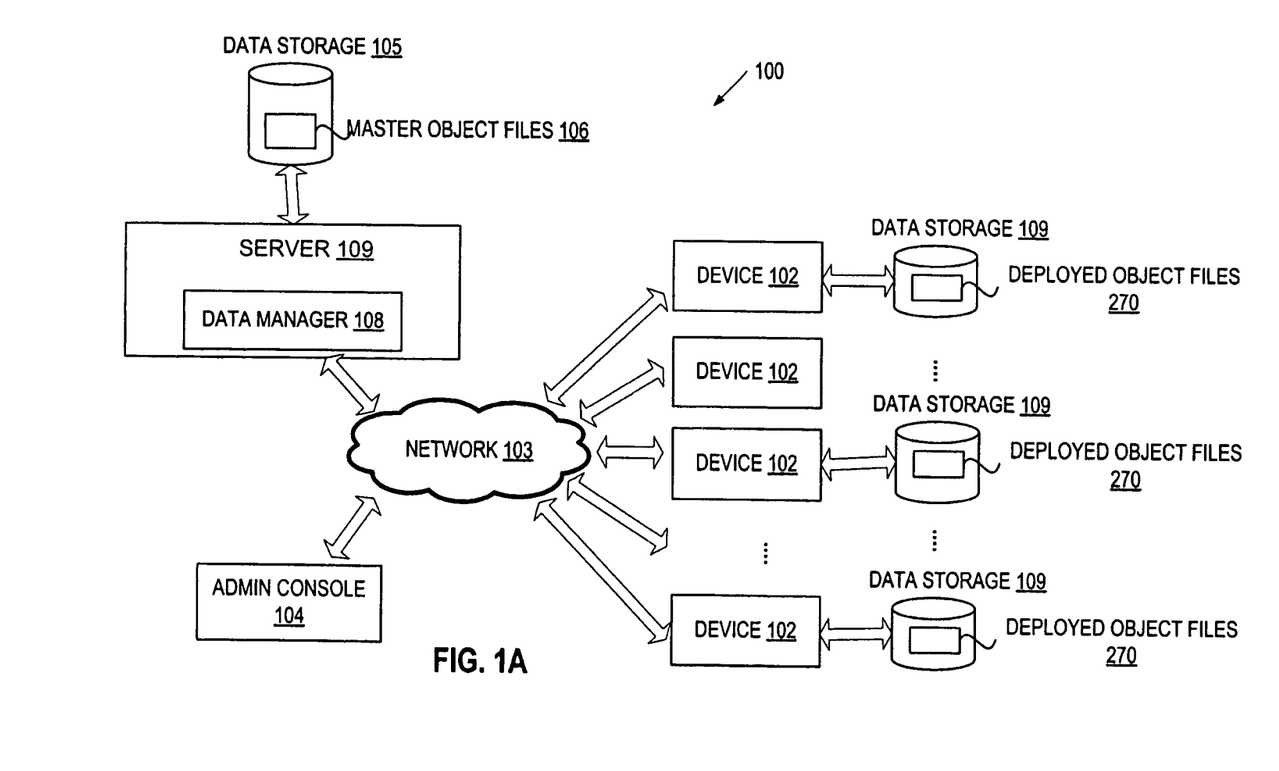
FIG. 1A illustrates a network architecture in which embodiments of the present invention may be implemented.

FIG. 1A illustrates an exemplary network architecture 100 in which embodiments of the present invention may operate. The network architecture 100 may include devices 102, a data manager 108 and a network 103. The devices 102 may be, for example, personal computers (PCs), mobile phones, palm-sized computing devices, personal digital assistants (PDAs), a network monitoring appliance, and the like. Each device 102 includes one or more hardware components, software components, or a combination of both, that are configurable. Each device 102 may store deployed object files 270 in data storage 109 or internal memory of the device 102. The deployed object files 270 will be described in greater detail below with reference to FIGS. 2-4.

In one embodiment, the data manager 108 may reside on a server 109, which stores and manages master data files 106 in data storage 105 for the devices 102, as well as performing additional tasks that are application-specific. The master data files 106 may also be stored in internal memory or caches of the server 109. The data manager 108 may contain a server front end responsible for network communications, plugins for server functions (such as security administration), a basic directory tree containing server-related data, and a database back end plugin responsible for managing the storage and retrieval of data from the data storage 105. The data storage 105 may comprise mass storage devices, such as magnetic or optical storage based disks or tapes.

The devices 102 are coupled to the data manager 108 via the network 103, which may be a public network (e.g., Internet) or a private network (e.g., Ethernet, a Local Area Network (LAN), or a corporate intranet). Each device 102 receives its data objects from the data manager 108 to perform application-specific tasks. For example, the data object may be a policy object that specifies a set of security rules (e.g., rules that define a firewall) for the device. Alternatively, the data object may be a configuration object that includes a collection of configuration items for configuring the device 102. In one embodiment, the device 102 includes a Web interface to allow a user (such as a system administrator at a remote console 104) to issue commands to the device 102 and to obtain data from the device 102.

Figure 1B:
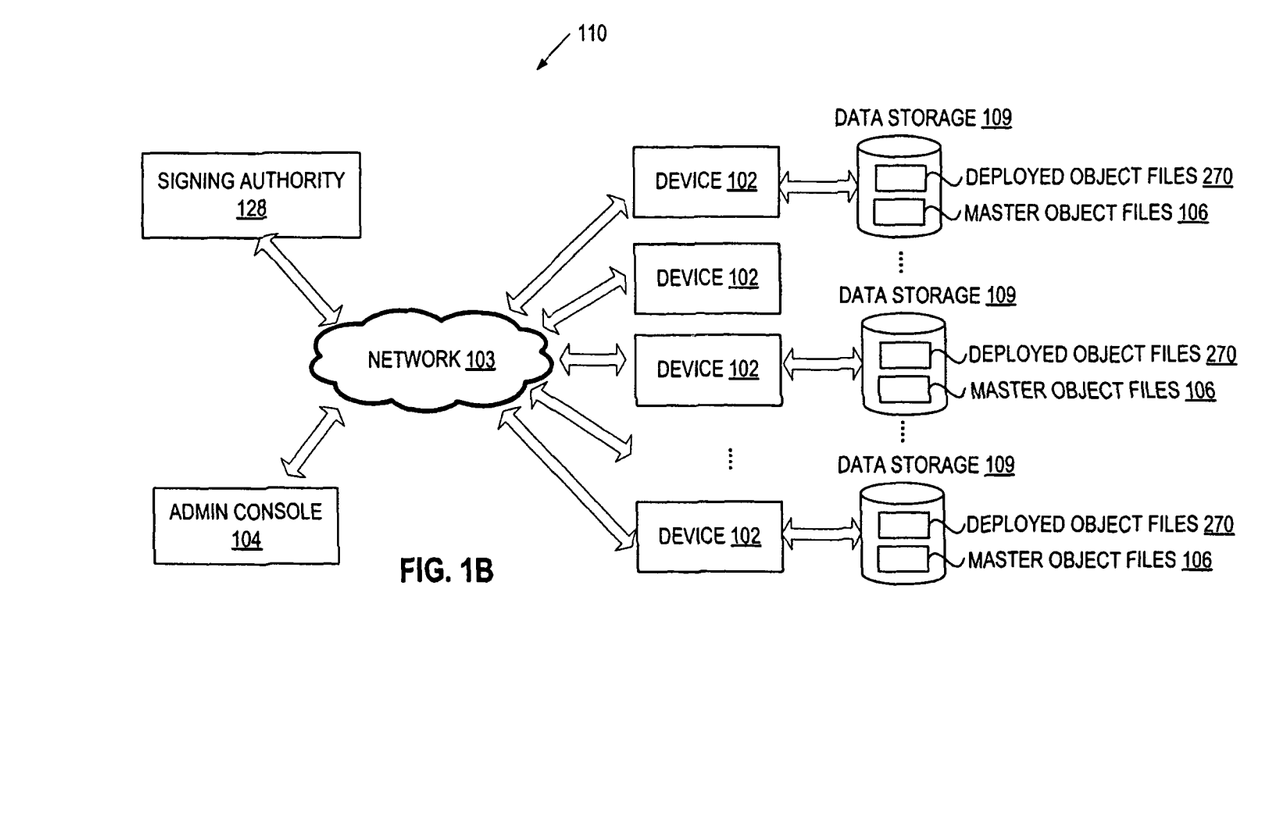
FIG. 1B illustrates a network architecture in which alternative embodiments of the present invention may be implemented.

In an alternative embodiment, the client-server system shown in FIG. 1A may be replaced with a peer-to-peer system 110 that includes the devices 102 but without the centralized data manager 108. Referring to the peer-to-peer system 110 of FIG. 1B, each device 102 can be both a user of distributed data objects (a client and a data manager that distributes data objects (a server). For example, a first device 102 can be a client of a second device 102 by receiving its data objects from the second device 102. The first device 102 can, at the same time, be a server for the second device 102 or a third device 102 by managing, storing and distributing the data objects to the second device 102 or the third device 102. Thus, in the peer-to-peer system 110, the functionality of data manager 108 of FIG. 1A is distributed among the devices 102. Each device 102 in the peer-to-peer system 110 may store its deployed object files 270 and the master object files 106 of other devices in data storage 109 or internal memory. In one embodiment, the peer-to-peer system 110 also includes a signing authority 128 to sign (authenticate) the data objects transported from one device to another. The system 110 may further include the administrator console 104 to issue commands to the device 102 and to obtain data form the data device 102. Although a client-server model will be used in the following descriptions, a person of ordinary skill in the art would appreciate that the techniques described herein can be readily applicable to a peer-to-peer model. Thus, it is understood that the "policy manager 108" in the following description may reside on a standalone server in a client-server system, or on any of the devices 102 in a peer-to-peer system.

Figure 2:
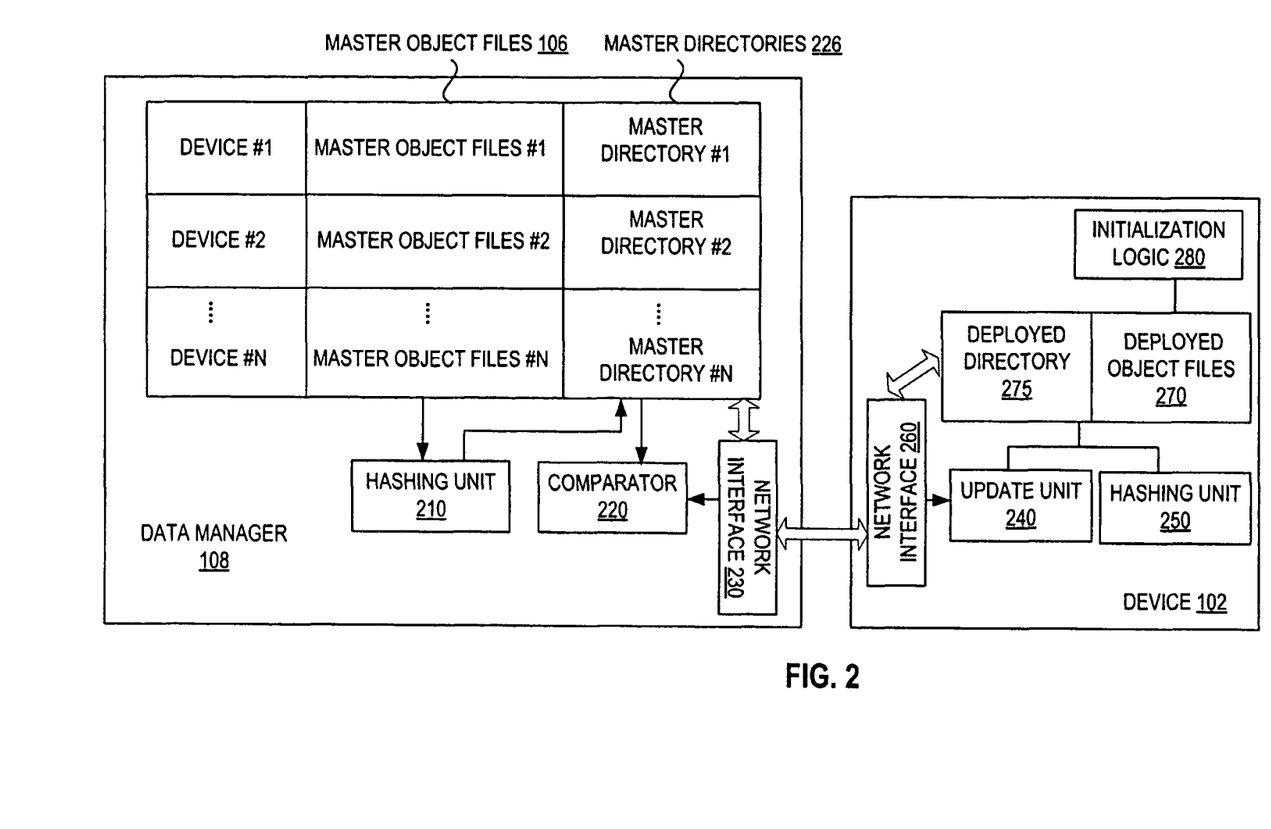
FIG. 2 illustrates a block diagram of one embodiment of a data manager and a data recipient.

FIG. 2 illustrates an embodiment of the data manager 108 and the device 102. It is understood that the data manager 108 and the device 102 may include components for performing additional tasks that are unrelated to object distribution. For simplicity of the description, details that are not germane to the present invention are not shown. The data manager 108 stores or has access to the master object files 106. The master object files 106 include, for each device 102 managed by the data manager 108, a list of the data objects to be deployed on the device according to what the device should have. Each data object is stored in one master data file 106, which can be identified by a compressed format (e.g., a master fingerprint) of the data object. That is, the master fingerprint can be used as a filename of that master data file 106. Each device is associated with a master directory 226, which contains a collection of the filenames for the data objects that the device should have. Thus, the data objects that a device should have can easily be determined by looking up the master directory 226 associated with the device.

Each data object corresponds to a data item in a transportable format, such as Extensible Mark-up Language (XML), JSON (Javascript Object Notation), Perl source code, or the like. When a data item is created or modified, the corresponding data object is also created or updated in the master object file 106. When a data item is deleted from a device 102, its corresponding data object is removed from the master object file 106 for that device 102. Each data item includes a collection of rules, commands, configuration parameters, or other suitable data entries. The following is an example of a portion of a configuration object for configuring a network monitoring appliance in JSON:

```
{
"CHECK_COMMAND" : 2,
"CHECK_INTERVAL" : 10,
"CONTACT_GROUPS" : [
14815
],
"CUSTOMER_ID" : 3673,
"DESCRIPTION" : "Test HTTPS",
"MAX_ATTEMPTS" : 1,
"NETSAINT_ID" : 12480,
"NOTIFICATION_INTERVAL" : 15,
"NOTIFY_CRITICAL" : 0,
......
}
```

In one embodiment, a master fingerprint can be generated by compressing the contents of a data object in the master object files 106. For example, the compression may be performed by a hashing unit 210, which hashes the list of data objects with a hash function (e.g., SHA-1, SHA-2, MD5, etc.). A hashed object is a compressed representation of the data object, and can be used as an identifier of that data object. The hashing unit 210 may serialize a data object into an alphanumeric string before applying the hash function. The data manager 108 also includes a comparator 220 to compare deployed fingerprints received from one of the devices 102 with the master fingerprints for that device. Based on the differences detected by the comparator 220, the data manager 108 retrieves the data objects corresponding to the differences from the device's master list. The data manager 108 further includes a network interface 215 for receiving the deployed fingerprints from the device 102 and for transmitting the data objects to the device 102.

In one embodiment, the device 102 stores deployed object files 270, which contains the objects currently deployed on the device 102. Each deployed object file 270 contains a deployed data object, which can be identified by a deployed fingerprint associated with the deployed data object. The deployed fingerprint is generated by a hashing unit 250 that hashes the deployed data object with the same hashing function used by the data manager 108. A deployed directory 275 contains the collection of deployed fingerprints (which can be used as filenames) associated with the data objects that the device currently has. The device 102 also includes an update unit 240 for updating the deployed object file 270 using the data objects received from the data manager 108. In one embodiment, the update unit 240 uses the code in the transportable data objects to generate data items that the device 102 needs to have. The device further includes a network interface 260 for transmitting the deployed fingerprints to the data manager 108 and for receiving the data objects from the data manager 108. In some embodiments, the device 102 also includes initialization logic 280 to provide initial data objects for the device upon device initialization.

Figure 3:
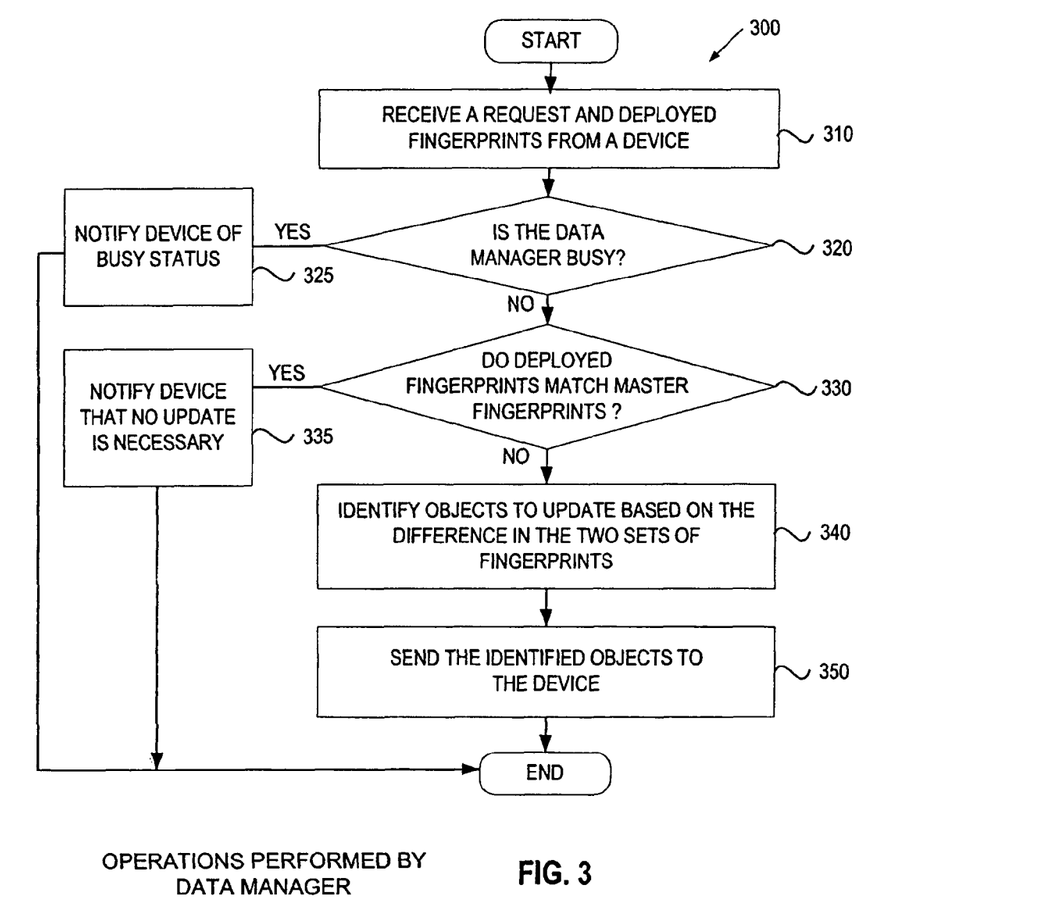
FIG. 3 illustrates a flow diagram of one embodiment of a process performed by the data manager.

FIG. 3 illustrates a flow diagram of one embodiment of a process 300 for configuring a device (e.g., the device 102 of FIG. 1). The process 300 may be performed by processing logic 526 of FIG. 5 that may comprise hardware (e.g., circuitry, dedicated logic, programmable logic, microcode, etc.), software (such as instructions run on a processing device), or a combination thereof. In one embodiment, the process 300 is performed by the data manager 108 of FIG. 1.

Referring to FIG. 3, at block 310, the process 300 begins with the processing logic 526 receiving a request from a device 102 (e.g., a network appliance device). The request includes a list of deployed fingerprints for the data objects that are currently deployed on the device 102. The process 300 first determines whether the data manager 108 is too busy to service the request. If the data manager 108 is busy, the process 300 continues to block 325 to notify the device 102 of the busy status, and ask the device 102 to call back at a later time. If the data manager 108 is not busy with other tasks, the process 300 at block 330 determines whether the deployed fingerprints match the master fingerprints stored at a data manager 108. If the fingerprints match, the process 300 notifies the device 102 that no update is necessary at block 335. The process 300 then terminates.

Proceeding to block 340, if there is a difference between the two sets of fingerprints, the process 300 determines one or more master fingerprints that do not correspond to any of the deployed fingerprints. For each of these master fingerprints, the process 300 identifies, by looking up the device's associated master directory 226, a corresponding data object as needing to be added to the device. The process 300 also determines one or more deployed fingerprints that do not correspond to any of the master fingerprints. These deployed fingerprints can be used as identifiers of the objects that need to be deleted from the deployed object file 270. The differences between the two sets of fingerprints may be caused by data objects that have been changed, deleted, or added to the master object file 106. The differences may also be the result of device initialization, during which only a subset of the device's needed setting is provided by initialization logic locally resident on the device.

Proceeding to block 350, the process 300 sends the identified data objects and, if any, identifiers (fingerprints) of the deployed objects to be deleted, to the device 102 that initiates the request. An example of the transmission format, in XML, may be:

```
<ObjectDelta>
    <NewObjects></NewObjects>
    <DeletedObjects></DeletedObjects>
</ObjectDelta>.
```

Either or both the NewObjects field and the DeletedObjects field can be empty if there is no object to add and/or delete. The process 300 then terminates. The process 300 may restart after a short interval, which is shorter than a normal poll interval for new data acquisition, but not immediately. The reason for waiting for a short interval before restarting the process 300 is to reduce possible network congestion, for example, from a device with problems applying configuration objects (which can happen when a disk is failing).

Figure 4:
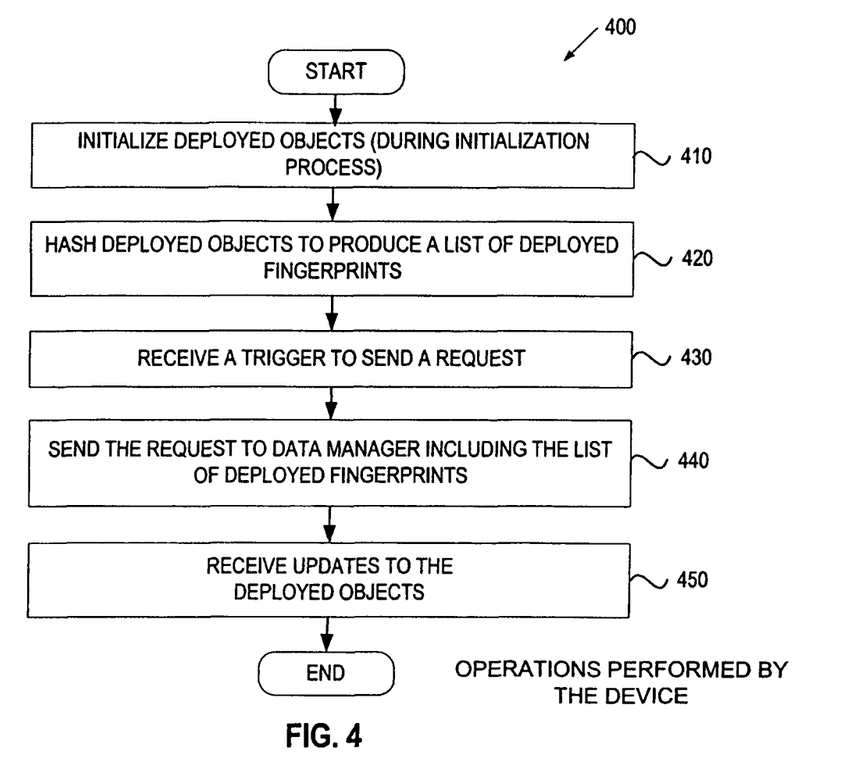
FIG. 4 illustrates a flow diagram of one embodiment of a process performed by the data recipient.

FIG. 4 illustrates a flow diagram of one embodiment of a process 400 for receiving policy objects at a configurable device. The process 400 may be performed by processing logic 526 of FIG. 5 that may comprise hardware (e.g., circuitry, dedicated logic, programmable logic, microcode, etc.), software (such as instructions run on a processing device), or a combination thereof. In one embodiment, the process 400 is performed by the device 102 of FIG. 1.

Referring to FIG. 4, at block 410, the process 400 begins with the processing logic 526 initializing its setting using deployed data objects. In one embodiment, the initial deployed data objects may be determined by initialization logic (e.g., initialization logic 280) locally residing on the device 102. The initial data objects may include just enough information for initializing the operations of the device, but may be insufficient to perform other application-specific tasks. At block 420, the process 400 hashes the deployed data objects to produce a list of deployed fingerprints. At block 430, the process 400 receives a trigger to send a request. The trigger may be part of the initialization sequence that allows the device 102 to complete its initialization. The trigger may be, alternatively, a command issued by an administrator via a Web interface of the device 102, a command issued by the data manager 108, or a timer that periodically expires to cause the device 102 to poll the data manager 108. At block 440, the list of currently deployed fingerprints are sent to the data manager 108. At block 450, an update to the deployed data objects is received. The process 400 may execute code to extract data items from the received data objects and update the deployed data objects accordingly. The process 400 then terminates. In one embodiment, the process 400 may loop back to block 420 to hash the deployed data objects, and wait until the next trigger is received. The trigger may be received a short time later if there are any updates to the master object file 106 associated with the device 102. Otherwise, the trigger is received much later when the timer expires.

Figure 5:
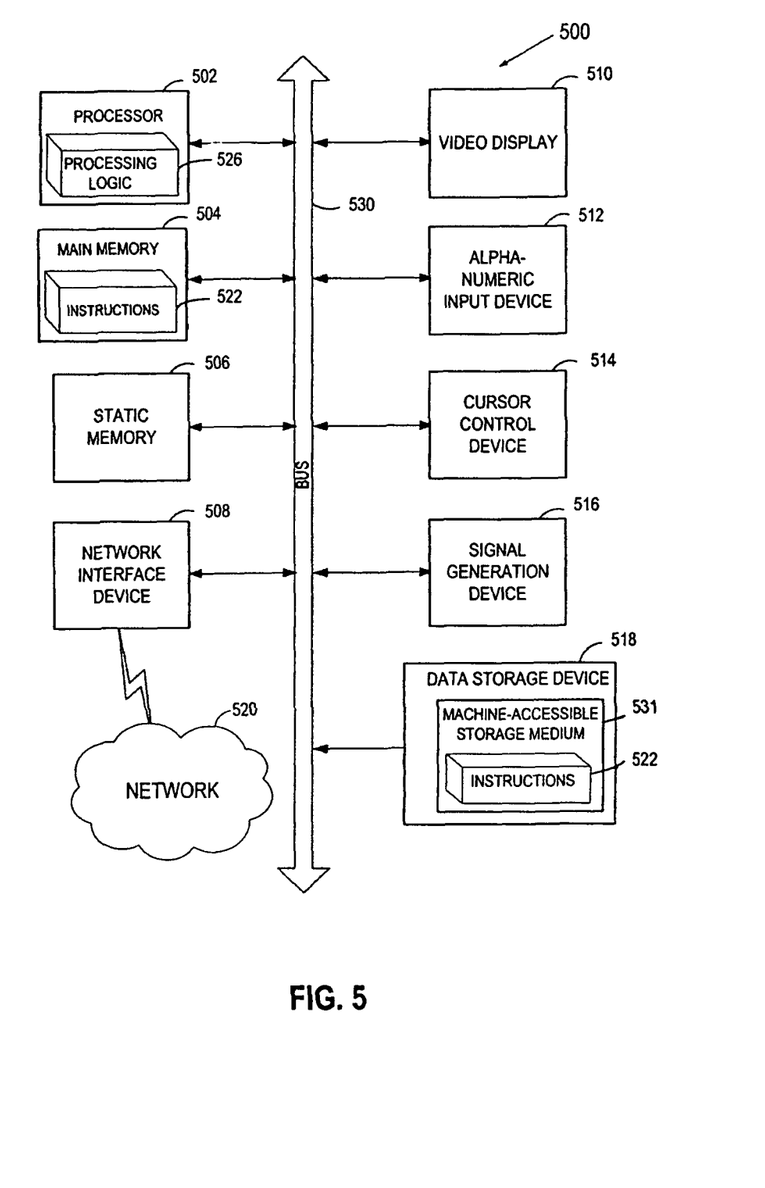
FIG. 5 illustrates a block diagram of an exemplary computer system implementing some embodiments of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store master object files and/or deployed object files (e.g., the master object files 106 and/or the deployed object files 270 of FIG. 2), and/or a software library containing methods performed by the data manager 108 and/or devices 102. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and system for efficiently distributing data objects over a network have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:
1. A computer-implemented method comprising:
applying a hashing function, at a first network device of a plurality of network devices of a peer-to-peer system, to each of a plurality of deployed data objects to produce corresponding fingerprints of the deployed data objects, wherein each of the deployed data objects is serialized into a corresponding alphanumeric string before applying the hashing function, and wherein a fingerprint of a deployed data object corresponds to a filename of the deployed data object;

generating a list of filenames of the deployed data objects that are currently deployed at the first network device, wherein each of the deployed data objects is stored in a data file at the first network device and is identified by the respective filename in the list, wherein the filenames are the fingerprints of the deployed data objects;

storing, in a data store associated with the first network device, the list of file names of the deployed data objects and a first master list of file names of data objects associated with the plurality of network devices;

sending, by the first network device, a request to a second network device of the plurality of network devices, the request comprising the list of filenames of the deployed data objects; and receiving, by the first network device from the second network device in response to the request, a comparison result indicating a difference exists between the list of filenames of the deployed data objects and a second master list of filenames of data objects associated with the plurality of network devices and stored in a data store associated with the second network device, the filenames in the second master list being generated by the second network device using the same hashing function as that applied at the first network device and indicating the data objects to be deployed at the first network device, the comparison result comprising a data structure comprising a new object field for one or more data objects to be added to the first network device and a delete object field for one or more filenames of deployed data objects to be deleted from the first network device.

2. The method of claim 1, wherein the deployed data objects are policy objects, each policy object comprising a collection of rules.

3. The method of claim 1, wherein the deployed data objects are configuration objects.

4. A system comprising:

a first network device of a plurality of network devices of a peer-to-peer system to apply a hashing function to each of a plurality of deployed data objects to produce corresponding fingerprints of the deployed data objects, wherein each of the deployed data objects is serialized into a corresponding alphanumeric string before applying the hashing function, and wherein a fingerprint of a deployed data object corresponds to a filename of the deployed data object;

the first network device to generate a list of filenames of the deployed data objects that are currently deployed at the first network device, wherein each of the deployed data objects is stored in a data file at the first network device and is identified by the respective filename in the list, wherein the filenames are the fingerprints of the deployed data objects;

the first network device associated with a data store to store the list of file names of the deployed data objects and a first master list of file names of data objects associated with the plurality of network devices;

the first network device to send a request to a second network device of the plurality of network devices, the request comprising the list of filenames of the deployed data objects; and the first network device to receive from the second network device in response to the request, a comparison result indicating a difference exists between the list of filenames of the deployed data objects and a second master list of filenames of data objects associated with the plurality of network devices and stored in a data store associated with the second network device, the filenames in the second master list being generated by the second network device using the same hashing function as that applied at the first network device and indicating the data objects to be deployed at the first network device, the comparison result comprising a data structure comprising a new object field for one or more data objects to be added to the first network device and a delete object field for one or more filenames of deployed data objects to be deleted from the first network device.

5. The system of claim 4, wherein the deployed data objects are policy objects, each policy object comprising a collection of rules.

6. The system of claim 4, wherein the deployed data objects are configuration objects.

7. A non-transitory computer readable storage medium comprising instructions that, when executed by a processing system, cause the processing system to perform operations comprising:

applying a hashing function, at a first network device of a plurality of network devices of a peer-to-peer system, to each of a plurality of deployed data objects to produce corresponding fingerprints of the deployed data objects, wherein each of the deployed data objects is serialized into a corresponding alphanumeric string before applying the hashing function, and wherein a fingerprint of a deployed data object corresponds to a filename of the deployed data object;

generating a list of filenames of the deployed data objects that are currently deployed at the first network device, wherein each of the deployed data objects is stored in a data file at the first network device and is identified by the respective filename in the list, wherein the filenames are the fingerprints of the deployed data objects;

storing, in a data store associated with the first network device, the list of file names of the deployed data objects and a first master list of file names of data objects associated with the plurality of network devices;

sending, by the first network device, a request to a second network device of the plurality of network devices, the request comprising the list of filenames of the deployed data objects; and receiving, by the first network device from the second network device in response to the request, a comparison result indicating a difference exists between the list of filenames of the deployed data objects and a second master list of filenames of data objects associated with the plurality of network devices and stored in a data store associated with the second network device, the filenames in the second master list being generated by the second network device using the same hashing function as that applied at the first network device and indicating the data objects to be deployed at the first network device, the comparison result comprising a data structure comprising a new object field for one or more data objects to be added to the first network device and a delete object field for one or more filenames of deployed data objects to be deleted from the first network device.

8. The non-transitory computer readable storage medium of claim 7, wherein the deployed data objects are policy objects, each policy object comprising a collection of rules.

9. The non-transitory computer readable storage medium of claim 7, wherein the deployed data objects are configuration objects.

* * * * *